W. H. SCUDDER.
Smoke-House.
No. 220,436. Patented Oct. 7, 1879.
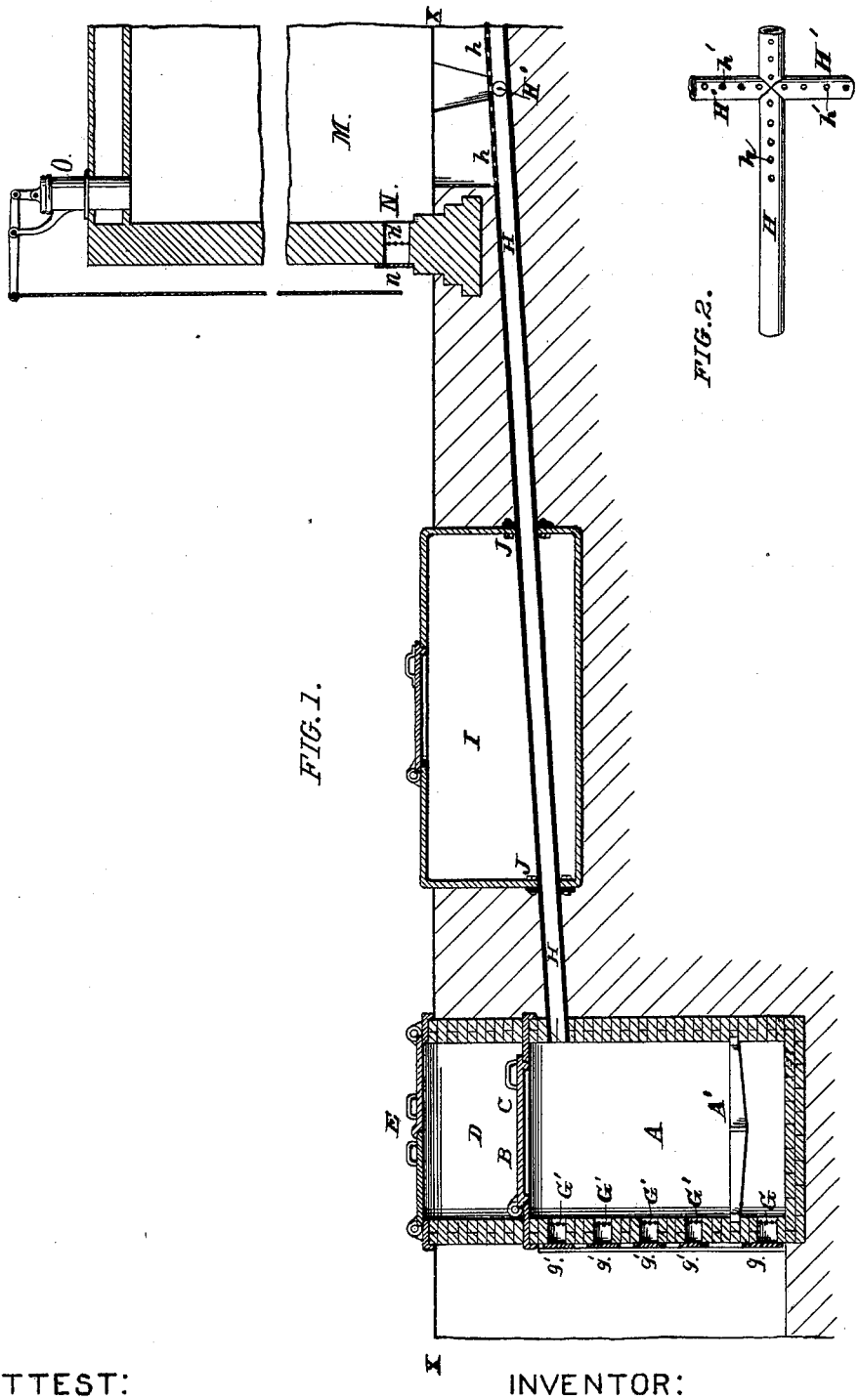
ATTEST:
Walter Allen
W. E. Guy
INVENTOR:
William H. Scudder
By Knight Bros Attys

UNITED STATES PATENT OFFICE.

WILLIAM H. SCUDDER, OF ST. LOUIS, MISSOURI.

IMPROVEMENT IN SMOKE-HOUSES.

Specification forming part of Letters Patent No. 220,436, dated October 7, 1879; application filed July 25, 1879.

*To all whom it may concern:*

Be it known that I, WILLIAM H. SCUDDER, of the city of St. Louis, in the State of Missouri, have invented a certain new and useful Improvement in Smoke-Houses, of which the following is a full, clear, and exact description, reference being had to the accompanying drawings, forming part of this specification.

My invention consists in the combination of a smoke-chamber having in its side a series of perforations, a heat-retaining chamber in the top of such smoke-chamber, a perforated pipe or flue, and a meat-chamber having gauze-covered air-openings at or near the bottom thereof.

My invention also consists in the combination of a smoke-chamber having a heat-retaining chamber, and provided in its side with air-openings and dampers, a meat-chamber having at the lower end air-openings and dampers, and a perforated pipe or flue connecting said smoke-chamber and meat-chamber together, as hereinafter set forth.

My invention also consists in the combination, with a smoke-generating chamber having in its side air-openings with suitable dampers and a heat-retaining chamber, of a meat chamber or chambers having at or near the bottom gauze-covered air-openings and at the top a smoke-outlet, and a perforated pipe or flue connecting such chambers together, and having at one end a perforated cross or branch pipe to convey the smoke in various directions other than in a direct line.

In the drawings, Figure 1 is a vertical section illustrating my invention. Fig. 2 is a perspective view of the smoke-pipe.

A is the chamber in which the smoke is generated. I prefer to construct this beneath the surface of the ground. The surface of the ground is shown at X X in the drawings.

The top B of the smoke-chamber A, I make of metal, to allow the ready escape of heat from the chamber when the weather is hot. I prefer to place the top B below the ground-level, to form a receptacle, D, that may receive sawdust, tan-bark, or any other material to prevent the escape of heat in cold weather, when it is required to raise the temperature of the meat-chamber M.

The receptacle D may have a cover, E, constituting the receptacle an air-chamber, which forms a very effective preventive to the escape of heat (when both covers C and E are closed.) C is the cover of the smoke-chamber proper.

The smoke-chamber is supplied with air through an opening, G, that has in it a damper, $g$, to regulate the amount of air entering the chamber beneath the grate.

$G'$ are openings above the grate, of which there may be one or more, having dampers $g'$, which may be opened to regulate the amount of air entering the smoke-chamber, and consequently the amount of smoke entering the meat-chamber.

The smoke leaves the chamber A through a pipe or flue, H, which may be cast-iron, cement, or any other suitable material. This pipe preferably passes through a cooling-chamber, I, that may contain cold water or ice, or which may be supplied with any cold medium to cool the part of the pipe H passing through it, and consequently to reduce the temperature of the smoke.

The pipe H is fitted to the walls of the chamber I with tight joints J, to prevent the escape of the fluid contents of the chamber.

The pipe H has perforations $h$, to admit air into the meat-chamber, and may be in communication with any number of meat-chambers M.

$H'$ are branch pipes, which have perforations $h'$, and which run crosswise of the meat chamber or chambers from the pipe H. The cross-pipes distribute smoke to all parts of the meat-chamber. In case any one of the meat-chambers is not in use the perforations may be covered by any suitable means, or the smoke may be shut off by means of a cock.

The meat-chamber M has opening or openings N (preferably one at each corner of the building) at the bottom, to admit cold air into the chamber, said openings being closed by dampers $n$, and provided with a fine gauze, $n'$, to prevent flies entering the meat-chamber.

The chamber has also opening or openings O at top, which may be opened by any suitable means to admit the passage of the smoke out, thereby causing, in connection with the openings N, a current of air in the meat-chamber. These openings are also provided with fine gauze or netting, to prevent flies entering the meat-room.

In the smoking of meat heretofore the fires occupy the same chamber with the meat. This is attended with a number of disadvantages that are avoided with my improved method.

First, there is considerable danger from fire, as is evinced by the high rate of insurance paid on smoke-houses. With my apparatus there is no more danger from fire than in an ordinary warehouse.

Second, there is an unnecessary quantity of wood consumed and of heat generated, the latter causing injury to or loss of rather a large percentage of the meat smoked in the summer season. With my apparatus the consumption of wood may be limited just as desired by limiting the amount of air entering the smoke-chamber; and by means of the pipe H, and means of cooling the smoke in its passage through it, smoke at low temperature may be supplied to the meat-chamber.

Third, in the ordinary method the meat must be hung high in the chamber, to be removed as much as possible from the influence of the fires, thus wasting much valuable space and causing much labor in handling. With my apparatus the meat may be hung as low as convenient without injury, thus availing the whole space of the meat-chamber.

Fourth, in the present wasteful use of wood it debars the use of any more expensive material to be applied with the smoke to impart desired flavors to the meat, whereas with my method the consumption of the wood is in such moderate quantity that more expensive articles may be added without adding too much to the expense of the operation.

My apparatus gives to me the power to control the heat of the smoke, and consequently the heat of the meat-chamber, to compensate for the changes of outside temperature. This is of great practical importance, as it saves much time in smoking, and the injury to and destruction of meat is avoided.

I claim as my invention—

1. The combination of smoke-chamber A, heat-retaining chamber D, perforated pipe or flue H, and meat-chamber M, provided with air-openings N at or near the bottom thereof, substantially as and for the purpose set forth.

2. The combination of smoke-chamber A, having heat-retaining chamber D, and provided with air-openings G G', dampers $g'$, perforated pipe or flue H, and the meat-chamber M, provided at the lower end with air-openings N and dampers $n$, substantially as set forth.

3. The combination of smoke-chamber A, air-openings G G', heat-retaining chamber D, pipe or flue H, having perforations $h$, cross pipe or flue H', having perforations $h'$, chamber or chambers M, provided with gauze-covered air-opening N, and smoke-outlet O, substantially as set forth.

WILLIAM H. SCUDDER.

Witnesses:
GEO. H. KNIGHT,
GEO. D. KNIGHT.